United States Patent
Rath (10) Patent No.: US 12,107,248 B2
(45) Date of Patent: Oct. 1, 2024

(54) ROBUST INTERFACE FOR COOLER TO HOUSING

(71) Applicant: Samsung SDI Co., Ltd., Yongin-si (KR)

(72) Inventor: Helmut Rath, St. Veit / Südstmk (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 355 days.

(21) Appl. No.: 17/217,480

(22) Filed: Mar. 30, 2021

(65) Prior Publication Data

US 2021/0305643 A1  Sep. 30, 2021

(30) Foreign Application Priority Data

Mar. 31, 2020  (EP) .................................... 20166991
Mar. 29, 2021  (KR) ......................... 10-2021-0040390

(51) Int. Cl.
*H01M 10/6568* (2014.01)
*B60K 1/04* (2019.01)
(Continued)

(52) U.S. Cl.
CPC ........... *H01M 10/6568* (2015.04); *B60K 1/04* (2013.01); *B60L 50/64* (2019.02); *H01M 10/613* (2015.04);
(Continued)

(58) Field of Classification Search
None
See application file for complete search history.

(56) References Cited

U.S. PATENT DOCUMENTS

| 5,897,146 A | 4/1999 | Saito et al. |
| 2014/0225363 A1 | 8/2014 | Burgers et al. |

(Continued)

FOREIGN PATENT DOCUMENTS

| AU | 2003100081 A4 | 7/2003 |
| CN | 106090476 A | 11/2006 |

(Continued)

OTHER PUBLICATIONS

Extended European Search Report issued in corresponding EP Application No. 20166991.8, dated Sep. 29, 2020, 5 pages.
(Continued)

*Primary Examiner* — Ula C Ruddock
*Assistant Examiner* — Mary Grace Byram
(74) *Attorney, Agent, or Firm* — LEWIS ROCA ROTHGERBER CHRISTIE LLP (57) ABSTRACT

An interface system for mechanically decoupling a cooling system includes: a housing having an opening; an inset having opposite first and second sides; an interface body having first and second ends and a bore-hole open to the first and second ends thereof. The inset has a recess in the second side to accommodate the interface body. The interface body is at least partially inserted into the inset, and the inset is at least partially inserted into the opening in the housing such that the first side of the inset is inside the housing. The first side of the inset has an opening open to the bore-hole of the interface body. One end of the bore-hole is configured to slidably receive an inlet of a cooling pipe, and the other end of the bore-hole is configured to be connected, in a fluid-tight manner, with an external coolant supply or coolant discharge.

17 Claims, 3 Drawing Sheets

(51) Int. Cl.
*B60L 50/64* (2019.01)
*H01M 10/613* (2014.01)
*H01M 10/625* (2014.01)
*H01M 10/6556* (2014.01)
*H01M 10/6557* (2014.01)
*H01M 10/6567* (2014.01)
*H01M 50/207* (2021.01)
*H01M 50/249* (2021.01)
*H01M 50/60* (2021.01)
*B60K 1/00* (2006.01)
*B60K 11/02* (2006.01)
*F16L 5/02* (2006.01)
*F16L 21/03* (2006.01)

(52) U.S. Cl.
CPC ..... *H01M 10/625* (2015.04); *H01M 10/6556* (2015.04); *H01M 10/6557* (2015.04); *H01M 10/6567* (2015.04); *H01M 50/207* (2021.01); *H01M 50/249* (2021.01); *H01M 50/60* (2021.01); *B60K 2001/005* (2013.01); *B60K 11/02* (2013.01); *F16L 5/025* (2013.01); *F16L 21/03* (2013.01); *H01M 2220/20* (2013.01); *Y02E 60/10* (2013.01); *Y02T 10/70* (2013.01)

(56) References Cited

U.S. PATENT DOCUMENTS

| | | |
|---|---|---|
| 2015/0152987 A1 | 6/2015 | Ishikawa |
| 2015/0188203 A1* | 7/2015 | Enomoto ............ H01M 50/24 429/83 |
| 2015/0255835 A1 | 9/2015 | Koller |
| 2015/0369412 A1 | 12/2015 | Berlusconi |
| 2016/0326745 A1 | 11/2016 | Lechuga et al. |
| 2018/0123195 A1 | 5/2018 | Fees et al. |
| 2018/0123198 A1 | 5/2018 | Fees et al. |
| 2019/0260102 A1 | 8/2019 | Schmiedhofer et al. |

FOREIGN PATENT DOCUMENTS

| | | |
|---|---|---|
| CN | 201162910 Y | 12/2008 |
| CN | 104701279 A | 6/2015 |
| CN | 105161789 A | 12/2015 |
| CN | 107514924 A | 12/2017 |
| CN | 108138490 A | 6/2018 |
| CN | 109891666 A | 6/2019 |
| CN | 209638581 U | 11/2019 |
| JP | 2008-008487 A | 1/2008 |
| KR | 10-2013-0113740 A | 10/2013 |
| TW | 384360 B | 3/2000 |
| WO | WO 2012/117697 A1 | 9/2012 |
| WO | WO 2018/081639 A1 | 5/2018 |

OTHER PUBLICATIONS

Chinese Office action issued in corresponding application No. CN 2021-10339069.7, dated Jul. 26, 2022, including English Translation, 26 pages.

Chinese Notice of Allowance issued in corresponding application No. 202110339069.7, dated Jan. 12, 2023, 7 pages, with English Translation.

* cited by examiner

ROBUST INTERFACE FOR COOLER TO HOUSING

CROSS-REFERENCE TO RELATED APPLICATION

This application claims priority to and the benefit of European Patent Application No. 20166991.8, filed in the European Patent Office on Mar. 31, 2020, and Korean Patent Application No. 10-2021-0040390 filed in the Korean Intellectual Property Office on Mar. 29, 2021, the entire content of each of which is incorporated herein by reference.

BACKGROUND

1. Field

Aspects of embodiments of the present disclosure relate to a liquid cooling interface system connecting a coolant supply or a coolant discharge to a cooling system for a battery cell or battery module.

2. Related Art

In recent years, vehicles for transportation of goods and people have been developed that use (or primarily use) electric power as a source for motion. An electric vehicle is an automobile that is propelled by an electric motor using energy stored in rechargeable (or secondary) batteries. An electric vehicle may be solely powered by batteries or may be a hybrid vehicle powered by, for example, a gasoline generator. Furthermore, the vehicle may include a combination of an electric motor and a conventional (internal) combustion engine.

Generally, an electric-vehicle battery (EVB), or traction battery, is a battery used to power the propulsion of battery electric vehicles (BEVs). Electric-vehicle batteries differ from starting, lighting, and ignition batteries because they are designed to provide power for sustained periods of time. A rechargeable (or secondary) battery differs from a primary battery in that it is designed to be repeatedly charged and discharged, while the latter is designed to provide an irreversible conversion of chemical to electrical energy. Low-capacity rechargeable batteries may be used as a power supply for small electronic devices, such as cellular phones, notebook computers, and camcorders, while high-capacity rechargeable batteries may be used as a power supply for hybrid vehicles and the like.

Generally, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case to enable charging and discharging of the battery via an electrochemical reaction of the positive electrode, the negative electrode, and the electrolyte solution. The shape of the case, for example, cylindrical or rectangular, may be varied depending on the battery's intended purpose. Lithium-ion (e.g., lithium polymer) batteries, widely known via their use in laptops and consumer electronics, predominate the most recent electric vehicles in development.

Rechargeable batteries may be used as a battery module including a plurality of unit battery cells coupled to each other in series and/or in parallel to provide high energy density, such as for motor driving of a hybrid vehicle. For example, the battery module may be formed by interconnecting the electrode terminals of the plurality of unit battery cells, the number and connection arrangement depending on a desired amount of power and to realize a high-power rechargeable battery.

A battery pack is a set of any number of battery modules, ideally identical battery modules. The battery modules may be configured (e.g., connected to each other) in a series, parallel, or a mixture of both to deliver the desired voltage, capacity, and/or power density. Components of battery packs include the individual battery modules and the interconnects, which provide electrical conductivity between them.

The mechanical integration of such a battery pack may utilize appropriate mechanical connections between the individual components, such as the battery modules, and between them and a supporting structure of the vehicle. These connections should remain functional and safe during the average service life of the battery system. Further, installation space and interchangeability requirements must be met, especially in mobile applications.

Mechanical integration of battery modules may be achieved by providing a carrier framework and by positioning the battery modules thereon. Fixing the battery cells or battery modules may be achieved by fitted depressions in the framework or by mechanical interconnectors, such as bolts or screws. In some cases, the battery modules are confined by fastening side plates to lateral sides of the carrier framework. Further, cover plates may be fixed atop and below the battery modules.

The carrier framework of the battery pack may be mounted to a carrying structure of the vehicle. If the battery pack is to be fixed at a bottom of the vehicle, the mechanical connection may be established from the bottom side by, for example, bolts passing through the carrier framework of the battery pack. The framework may be made of aluminum or an aluminum alloy to reduce the total weight of the construction.

Conventional battery systems, despite any modular structure, usually include a battery housing that acts as an enclosure to seal the battery system against the environment and to provide structural protection to the battery system's components. Housed battery systems are usually mounted as a whole into their application environment, such as in an electric vehicle. Thus, the replacement of defect system parts, for example, a defective battery submodule, requires dismounting (e.g., removal of) the whole battery system, including the removal of its housing first. Even defects of small and/or cheap system parts might then lead to dismounting and replacement of the complete battery system and its separate repair. As high-capacity battery systems are relatively expensive, large, and heavy, said procedure proves burdensome and the storage of the bulky battery systems, such as in a mechanic's workshop, becomes burdensome.

A thermal management system may be employed to provide thermal control of the battery pack such that it may be safely used. The thermal management system of the at least one battery module may efficiently emit, discharge, and/or dissipate heat generated from its rechargeable batteries. If the heat is not sufficiently emitted/discharged/dissipated, temperature deviations may occur between respective battery cells, such that the at least one battery module may no longer generate a desired amount of power. In addition, an increase of the internal temperature can lead to abnormal reactions occurring therein, and thus, charging and discharging performance of the rechargeable battery may deteriorate and the life-span of the rechargeable battery may be shortened. Thus, cell cooling for effectively emitting/discharging/dissipating heat from the cells is important.

To supply the cooling system for a battery cell or battery module with a liquid coolant, or to discharge the consumed (or circulated) coolant from the cooling system, interfaces are employed and may be integrated into a wall of a housing for the battery cell or battery module. These interfaces are adapted for connecting external (i.e., outside the housing) pipes or hoses for coolant supply or discharge with the pipes or hoses being or extending, at least partially, inside the housing as part of the cooling system. For example, an interface integrated into the wall of the housing may be connectable from outside the housing with external hoses or pipes for coolant supply or discharge and may be further connectable inside the housing with internal pipes or hoses that are part of the cooling system.

However, liquid cooling interfaces according to the related art have disadvantages, for example, external mechanical forces that are exerted on the interface by, for example, hits, crushes, or pressure of components arranged adjacent to the housing of the battery cell or battery module in the vehicle, are transmitted to the internal pipes of the cooling system, increasing the risk of damage or destruction of the battery cell's or battery module's cooling system. As another example, liquid cooling interfaces according to the related art do not provide a combination of mechanical decoupling together with positive substance jointing (e.g., welding or brazing) inside of the electrical space of a housing of a battery cell or battery module.

SUMMARY

According to embodiments of the present disclosure, at least some of the drawbacks of the related art may be overcome by a cooling interface system that allows for a mechanical decoupling of the cooling interface and the components of the cooling system integrated in the battery cell or battery module.

Embodiments of the present disclosure seek to resolve or mitigate at least one of the problems existing in the related art to at least some extent. For example, a cooling interface system (in the following also shortly referred to as an "interface system") for mechanically decoupling a coolant interface (hereinafter also referred to as "interface body") and a cooling pipe and/or cooling system of a battery cell (or battery module) for a vehicle is provided. The interface system includes a housing for a battery cell or a battery module, an inset having a first side and a second side opposite to the first side, and an interface body having a first end and a second end and also having a bore-hole with a first opening at the first end and a second opening at the second end. The housing includes a part having an opening (e.g., a hole). The inset includes a recess in the second side to receive the interface body. The interface body is at least partially inserted into the inset such that the first end of the interface body is in the recess of the inset. The inset is at least partially inserted into the part through the opening such that the first side of the inset is inside the housing. The first side of the inset has an opening (e.g., a hole) allowing access from the first side of the inset to the first opening of the bore-hole of the interface body when the interface body is inserted into the inset. The first opening of the bore-hole through the interface body is configured to slidably receive an inlet of the cooling pipe, and the second opening of the bore-hole through the interface body is configured to connect, in a fluid-tight manner, with a cooling supply or cooling discharge (e.g., a pipe or a hose).

It is irrelevant whether the part of the housing for the battery cell or battery module is a component of the housing that is separable from the remainder of the housing or whether the part of the housing is integrally formed with the remainder of the housing. Thus, in embodiments of the present disclosure, the interface system includes a part of the housing that is separable from the remainder of the housing. According to other embodiments of the present disclosure, however, the interface system includes an integral housing for a battery cell or battery module in which the part is integrally formed with the remainder of the housing.

In one embodiment of the interface system, the inset is inserted into the opening in the part of the housing, and the interface body is inserted into the inset.

In one embodiment of the interface system, the inlet of the cooling pipe extends through the opening in the first side of the inset and is at least partially inserted, in a slidable manner, into the first opening of the bore-hole through the interface body.

In one embodiment, the interface system further includes a seal between the inner surface of the opening in the first side of the inset and the outer surface of the inlet.

In one embodiment of the interface system, the seal is an elastic seal or a cohesive seal.

In one embodiment, the interface system includes a drain channel between the inset and the interface body. The drain channel may lead from the first opening of the bore-hole of the interface body to the outside of the housing.

In one embodiment of the interface system, the inset and the housing are configured such that when the inset is not fixed to the housing, the inset is moveable relative to the housing from the outside of the housing through the opening in the housing into the inside of the housing.

In one embodiment of the interface system, the inset includes a seal abutting against an outer side of the housing when the inset is inserted into the opening in the part of the housing.

In one embodiment of the interface system, the inset is fixable to the part of the housing. For example, screws may be used to fix the inset to the part of the housing.

In one embodiment of the interface system, the inset includes a first collar, and when the inset is inserted into the opening in the part of the housing, the first collars abuts against an outside wall of the part of the housing. The first collar facilitates fixation of the inset to the housing.

In one embodiment of the interface system, the interface body is fixable to the inset.

In one embodiment of the interface system, the interface body is fixable to the part of the housing. For example, screws may be used to fix the interface body to the part of the housing.

In one embodiment of the interface system, the interface body includes a second collar, and when the interface body is inserted into the inset that is inserted into the opening in the part of the housing, the second collar abuts against the outside wall of the part of the housing and/or against the first collar of the inset.

In one embodiment of the interface system, the interface body and the inset are both fixable to the part of the housing by using the same fixing elements. The fixing elements may be screws.

A further embodiment of the present disclosure relates to a battery system including the interface system according to an embodiment of the present disclosure.

Further embodiments of the present disclosure may be learned from the claims and/or the following description.

For example, embodiments of the present disclosure provide one or more of the following aspects and features: mechanical decoupling of external forces on the coolant-interface to the inner cooling pipes; tolerance compensation—radially and axially—between the cooling system/the cooling pipe and the housing; positive substance jointing in the electrical space; n additional coolant-seal outside of the seal between the internal coolant pipe and inset of the interface system; a coolant drainage channel to detect a damaged coolant-seal and to keep away the coolant-pressure from the seal between the internal coolant pipe and inset of the interface system; and a damaged coolant-seal that can be replaced without opening the electrical space.

The interface system according to embodiments of the present disclosure provides improved robustness in regards to coolant leakage inside the battery housing compared to related-art designs.

BRIEF DESCRIPTION OF THE DRAWINGS

Aspects and features of the present disclosure will become apparent to those of ordinary skill in the art by describing, in detail, example embodiments thereof with reference to the attached drawings in which.

DETAILED DESCRIPTION

Reference will now be made, in detail, to embodiments, examples of which are illustrated in the accompanying drawings. Aspects and features of the embodiments, and implementation methods thereof, will be described with reference to the accompanying drawings. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described.

In the drawings, like reference numerals denote like elements, and redundant descriptions thereof may be omitted. In the drawings, the relative sizes of elements, layers, and regions may be exaggerated for clarity. As used herein, the term "and/or" includes any and all combinations of one or more of the associated listed items. Further, the use of "may" when describing embodiments of the present disclosure refers to "one or more embodiments of the present disclosure."

It will be further understood that the terms "include," "comprise," "including," "comprising," "have," or "having" specify a property, a region, a fixed number, a step, a process, an element, a component, and a combination thereof but do not exclude other properties, regions, fixed numbers, steps, processes, elements, components, and combinations thereof.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centered on the value. Further, the use of "may" when describing embodiments of the present disclosure refers to "one or more embodiments of the present disclosure."

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
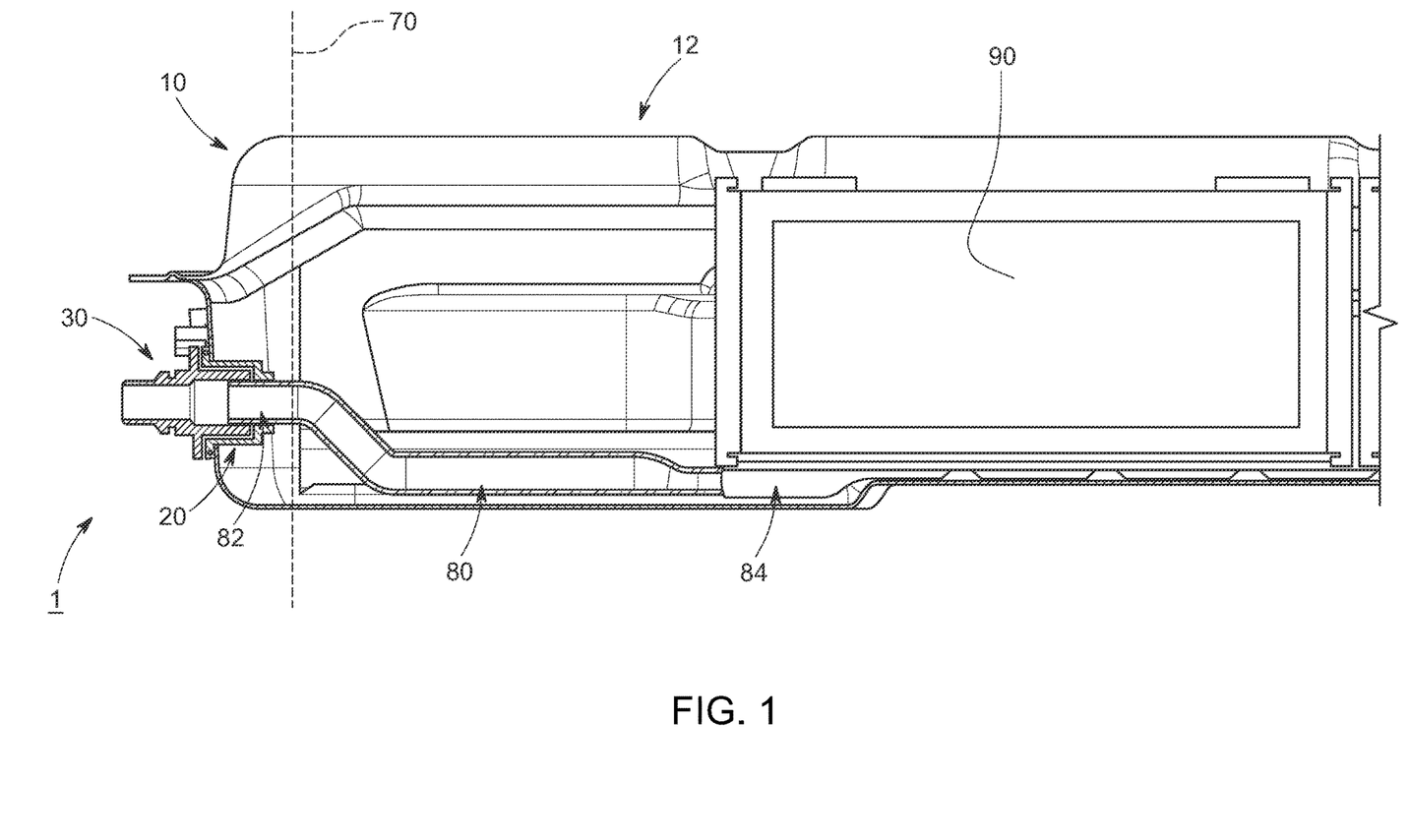
FIG. 1 is a longitudinal sectional view through a housing including a battery cell, a cooling system, and a cooling interface system according to an embodiment of the present disclosure.

FIG. 1 is a longitudinal sectional view through a housing 12 that includes (e.g., accommodates or houses) a battery cell 90, a cooling system 84, and a cooling interface system 1 according to an embodiment of the present disclosure. FIG. 1 illustrates how the cooling interface system 1 is used and connected to the cooling system 84 of the battery cell 90 according to an embodiment of the present disclosure. The interface system 1 includes a part (or portion) 10 of the housing 12, for example, a side wall of a bottom part (or bottom portion) of the housing 12 (e.g., the part of the housing 12 depicted in FIG. 1 on the left side of the dashed line 70). The part 10 of the housing 12 is configured for connecting a coolant supply and/or a coolant discharge, for example, an external pipe or hose, to the internal cooling system 84. The cooling system 84 is arranged below and adjacent to the battery cell 90. Hence, heat dissipation occurs from the battery cell 90 to a liquid coolant streaming (e.g., flowing or circulating) through the cooling system 84.

To supply coolant to the coolant system 84 and to discharge consumed (e.g., circulated) coolant from the cooling system 84, the cooling system 84 is connected to an external coolant supply and an external coolant discharge. To that end, the cooling system 84 is connected, inside the housing 12, with a cooling interface system 1 via a cooling pipe 80. The cooling pipe 80 may be used for coolant supply or for coolant discharge. Generally, both a coolant supply as well as a coolant discharge are included in the cooling system 84. In some embodiments, the part 10 of the housing 12 is equipped with a plurality of (e.g., two) cooling interface systems according to embodiments of the present disclosure (see, e.g., FIG. 2), but only one cooling interface system is shown in FIG. 1.

As shown in FIG. 1, the cooling interface system 1 is arranged in a wall of the part 10 of the housing 12 and includes an inset 20 and an interface body 30. The inset 20 is inserted (e.g., partially inserted) into an opening (e.g., a hole) in the wall of the part 10 of the housing 12. The interface body 30 is partially inserted, in turn, into the inset 20, and one end thereof protrudes from the part 10 of the housing 12 to the outside of the housing 12. The nested arrangement of the components of the cooling interface system 1 will be described in more detail below with respect to FIGS. 4(a)-4(c).

The inset 20 and the interface body 30 may each be plastic injection molded components with additional sealing elements. The cooling pipe 80 including the inlet 82 and the cooling system 84 including a cooling plate may be a single (e.g., an integral) component. The material of the cooling pipe 80 and cooling system 84 may be aluminum or stainless steel, and they may be joined together by brazing or welding. In other words, the cooling pipe 80 and cooling system 84 may be joined by using a positive substance jointing method, which has improved robustness compared to non-cohesive connections, such as gluing or a hose-clip connection. The length of the cooling pipe 80 shown in FIG. 1 is only an example, and it may be shorter or longer than depicted.

Figure 4A:
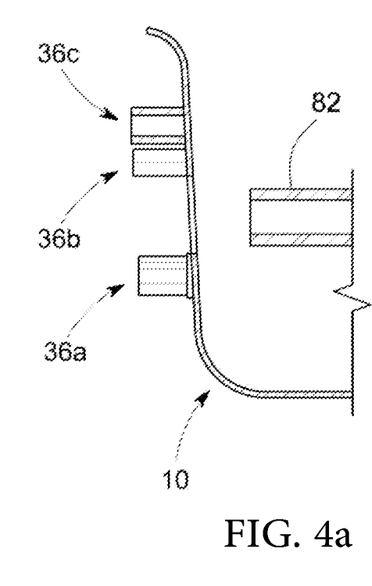
FIGS. 4(a)-4(c) illustrate the nested assembly the interface system according to an embodiment of the present disclosure.
Figure 4B:
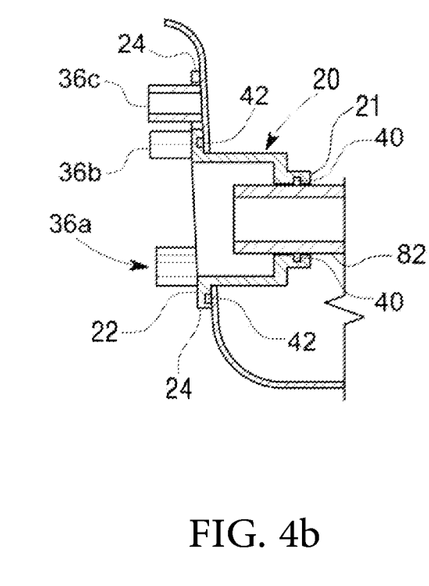
Figure 4C:
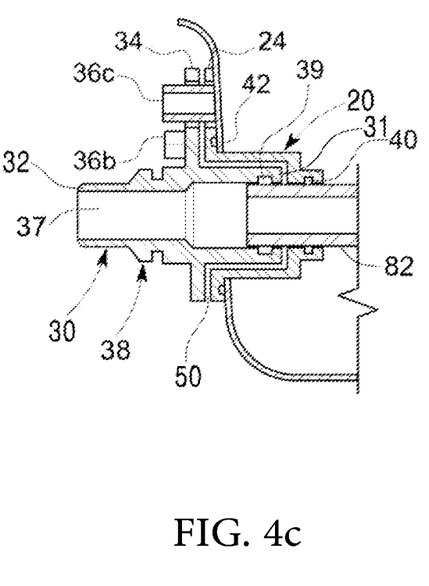

An enlarged view of the assembly shown on the left side of the dashed line 70 in FIG. 1 is shown in FIG. 4(c). As shown in FIGS. 1 and 4(a)-4(c), a portion of the inlet 82 of the cooling pipe 80 is inserted through an opening (e.g., a hole) in a first side 21 of the inset 20 facing the inside of the housing 12 and into a bore-hole 37 in the interface body 30. For example, the inlet 82 of the cooling pipe 80 is slidably arranged in the opening in the first side 21 of the inset 20 and is subsequently inserted into an opening (e.g., a hole) in the first end of the interface body 30 so as to be slidably arranged in at least a part of the bore-hole 37 of the interface body 30. For example, the inlet 82 of the cooling pipe 80 can slide back and forth by an amount (e.g., by a distance) inside the bore-hole 37 along a longitudinal center axis thereof or, vice-versa, the interface body 30 can slide relative to the inlet 82 being bedded, at least partially, within the inside of the bore-hole 37 of the interface body 30. Accordingly, even when the interface body 30 is moved along the direction of its longitudinal center axis, for example, due to a force acting on the interface body 30 from outside (or also from inside) of the housing 12, the movement is not conveyed or transferred to the inlet 82 of the cooling pipe 80 or at least such movement of the interface body 30 is not entirely (or directly) conveyed or transferred to the inlet 82.

Hence, hits, pushes, or crushes against the interface body 30 are also not transferred to the cooling pipe 80 or the cooling system 84 connected with the cooling pipe 80. Damage of the cooling pipe 80 or the cooling system 84 is thus mitigated or avoided.

The interface body 30 is nested into the inset 20 (see, e.g., FIG. 4) at (or in) an opening (e.g., a hole) in the side of the inset 20 facing the interior of the housing (e.g., through the first side 21 of the inset 20; see, e.g., FIG. 4). The inlet 82 of the cooling pipe 80 is then passed or led through the opening in the first side 21 of the inset 20 into the bore-hole 37 of the interface body 30. The opening in the first side 21 of the inset 20 encompasses or embraces (e.g., surrounds a periphery of) the inlet 82 of the cooling pipe 80. To prevent leakage of coolant out of the interface body 30 along the inner surface of the bore-hole 37 surrounding the inlet 82, a seal 40 may be arranged between the inner surface of the opening in the first side 21 of the inset 20 and the outer surface of the inlet 82. However, to prevent leakage of coolant out of the interface body 30 into the interior of the housing 12, for example, in case of a deteriorated or degenerated seal 40, a drain channel 50 may be provided, and the drain channel 50 leads from the inner surface of bore-hole 37 surrounding the inlet 82 to the outside of the part 10 of the housing 12. In embodiments of the interface system 1 according to the present disclosure, a plurality of drain channels 50 as described above may be implemented into the interface system 1.

Figure 2:
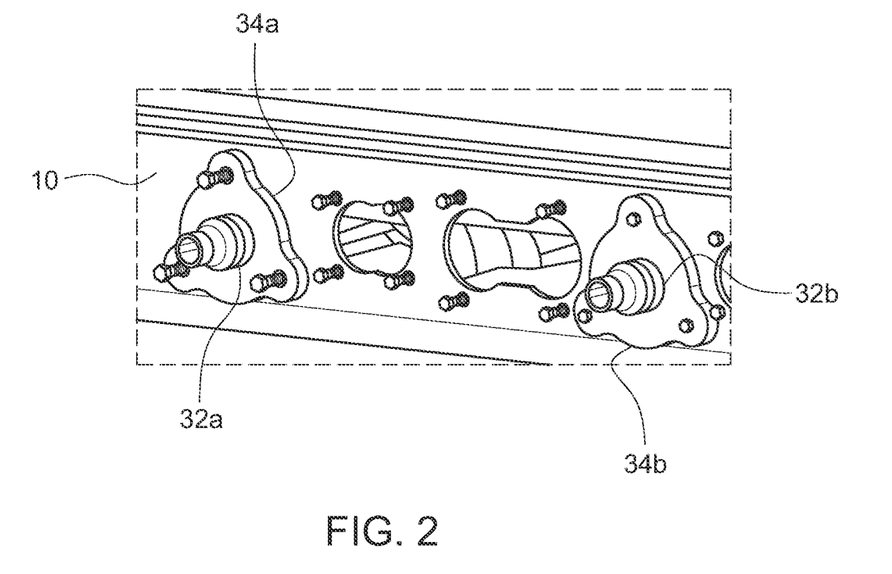
FIG. 2 shows, as a detailed isometric view, a part of a side wall of the housing with two interface systems according to an embodiment of the present disclosure.

FIG. 2 shows, as a detailed isometric view, a part of the part 10 of the housing 12 with two interface systems according to an embodiment of the present disclosure. A first interface system is visible on the left side of the part 10 of the housing. The first interface system may act as a coolant supply for the battery cell's 90 cooling system 84. Visible from outside the housing 12 are the second end 32a and a collar 34a of the interface body 30 of the first interface system. The second end 32a of the interface body 30 of the first interface system is configured to be connected with an external coolant supply (e.g., a pipe or hose). The collar 34a of the interface body 30 of the first interface system abuts against the outer wall of the part 10 of the housing and facilitates the fixation of the interface body 30 on the part 10 (see, e.g., FIG. 3). A second interface system is visible on the right side of the visible section of the part 10 of the housing 12. The second interface system may act as a coolant discharge for the battery cell's 90 cooling system 84. The arrangement of the second interface system within the part 10 of the housing is similar to that described before as to the first interface system.

Figure 3:
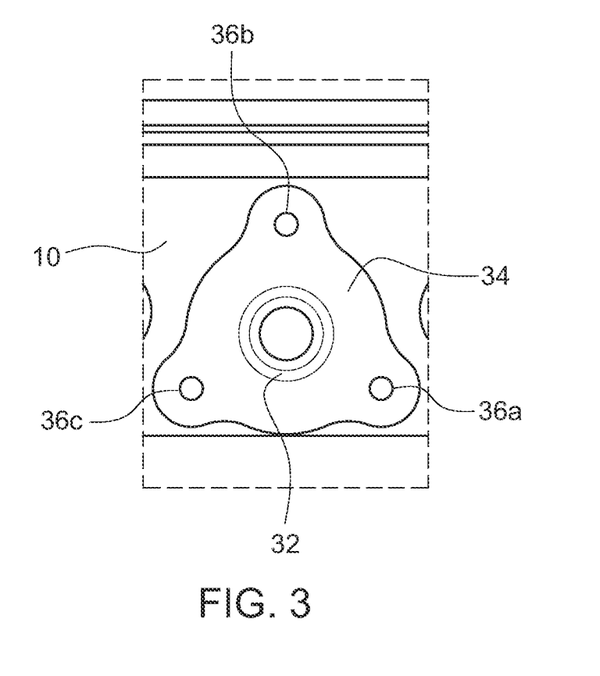
FIG. 3 shows a front view of the side wall of the housing in which the interface system according to embodiments of the present disclosure is integrated.

FIG. 3 shows a detailed front view of the part 10 of the housing 12 according to embodiments of the interface system according to the present disclosure. Those parts of the interface body 30 of an interface system 1 that are outside the part 10 of the housing 12 when the interface system 1 is arranged into the wall of the part 10 are shown in FIG. 3. For example, a second end 32 of the interface body 30 protrudes from the part 10, and the second end 32 is configured to be connected to an external hose or pipe that supplies or discharges coolant. The interface body 30 also includes a collar 34, with which the interface body 30 can be fixated to the outer side of the part 10 of the housing 12. The collar 34 may have a plurality of through-holes, for example, three through-holes, through which fixing elements 36a, 36b, 36c (e.g., screws) may be passed so as to attach the collar 34 to the part 10 of the housing 12.

The sequence of an assembly of one embodiment of the interface system 1 according to the present disclosure is shown in FIGS. 4(a)-4(c) will now be described. Inner components (e.g., the components in the interior of housing 12 after integration of the cooling interface system 1 into the housing of the battery) are assembled first (e.g., cooler, cells, electric, etc.). The inset 20 is put from the outside of the housing 12 through an opening in a part 10 of the housing 12 and over the inlet 82 of the cooling pipe 80 to provide environmental protection. Then, the interface body 30 is put into the inset 20 and also over the cooling pipe 80. Finally, the inset 20 and the part interface body 30 are fixed together (e.g., screwed) onto the part 10 of the housing 12.

FIG. 4(a) illustrates the part 10 of the housing 12 for the battery cell as shown in FIG. 1. Fixing elements 36a and 36b are arranged on the outer side of the part 10. Inside the housing 12, a pipe is arranged having an inlet 82 directed along its longitudinal center axis to the inner wall of the part 10. Upon implementing the interface system 1 into the part 10 of the housing 12, an approximately cup-shaped inset 20 is inserted, at least partially, through an opening in the part 10 as shown in FIG. 4(b). The inset 20 has a first side 21 that is inside (e.g., faces inside) of the housing 12. A second side 22 of the inset 20 opposite to the first side 21 is accessible from outside the part 10 of the housing 12 (e.g., from the left in FIG. 4(b)). The inset 20 has an opening (e.g., a hole) through which the inlet 82 of the pipe 80 can be passed. A first seal 40 may be provided between the inner surface of the opening in the inset 20 and the outer surface of inlet 82 primarily to protect the interior of the housing 12 against the outer environment and secondarily against leakage of a further seal 39 in the interface body 30 to the interior of the housing 12. The further seal 39 is arranged in the bore-hole 37 near the first end 31 of the interface body 30 (e.g., the further seal 39 is arranged on the inner surface of a portion of the bore-hole 37, and that portion extends to the first end 31 of the interface body 30). The first seal 40 may be an elastic seal. The second side 22 of the inset 20 may include a collar 24 overhanging radially with respect to a longitudinal center axis of the inset 20 in front of the outer wall of the part 10 of the housing 12 to allow fixation of the inset 20 to the part 10. A second seal 42 may also be provided between the collar 24 of the inset 20 and the part 10. For example, the second seal 42 may protect the interior of the housing 12 against the environment.

Then, an interface body 30 is inserted into the inset 20 as shown in FIG. 4(c). The interface body 30 has a first end 31, which includes the further seal 39 that seals between a portion of the inner surface of the bore-hole 37 of the interface body 30 against the outer surface of the pipe 80. A second end 32 of the interface body 30 protrudes from the outer wall of the part 10, when the interface system 1 is assembled. The interface body 30 has a bore-hole 37 extending from the first end 31 to the second end 32 of the interface body 30. The inlet 82 is slidably inserted, through the first end 31 of the interface body 30, into a portion of the bore-hole 37 that includes the seal 39, as described above with respect to FIG. 1. The second end 32 is configured to be connected with an external hose or pipe that supplies coolant to or discharges coolant from the cooling system 84 of the battery cell 90 via the interface system 1. To facilitate the installation or connection of an external hose or pipe to the second end 32 of the interface body 30, the second end 32 of interface body 30 may have a circumferential bulge 38 on its outer surface.

In the embodiment shown in FIG. 4(c), the interface body 30 further includes a collar 34 overhanging radially with respect to a longitudinal center axis of the interface body 30 in front of the outer wall of the part 10 to allow fixation of the interface body 30 to either the part 10, to the collar 24 of the inset 20, or to both the collar 24 of the inset 20 and the part 10. In the embodiment depicted in FIG. 4(c), the collar 34 of the interface body 30 is fixed to both the collar 24 of the inset 20 and the part 10, and the same fixation elements 36a and 36b are employed for such fixation.

With the assembly shown in FIG. 4(c), a mechanically decoupled system (e.g., connection) between the cooling system 84 of the battery cell 90/the cooling pipe 80 and the interface body 30 is established. If a force is applied to the costumer-cooling-interface, no (or minimal) forces will be passed to the cooling system 84/the cooling pipe 80. Further, in case of a damaged seal on the interface body 30, the leaking coolant can flow out of the inset 20 through a small drain channel 50.

Also, the inset 20 and the interface body 30 may be centered over the inlet 82 of the cooling pipe 80 for an optimal sealing. Openings (or holes) provided in the collars 24, 34 of the inset 20 and/or the interface body 30 may be sufficiently large to provide adequate tolerance compensation. In this context, the term "tolerance compensation"

relates to a certain space that allows, if one wants to assemble more than two components to an assembly, adjustment of the position of the single components relative to another, as each of the single components has its own manufacturing tolerance (e.g., variances in thickness, length, and the like) and also positional tolerance for every single component is required upon assembling. In other words, the "tolerance compensation" is provided to compensate for variances in the geometry of the individual components due to their manufacturing variances as well as for variances in their position upon assembly of these components.

SOME REFERENCE NUMERALS 1 cooling interface system
10 part of a housing for a battery cell (or battery module)
12 housing for a battery cell (or battery module)
20 inset
21 first side of inset
22 second side of inset
24 collar of inset
30 interface body
31 first end of interface body
32, 32a, 32b second end of interface body
34, 34a, 34b collar of interface body
36a, 36b, 36c screws
37 bore-hole through interface body
38 circumferential bulge
39 further seal
40 first seal
42 second seal
50 drain channel
70 virtual (or imaginary) line
80 pipe of an internal cooling system for the battery cell (or battery module)
82 inlet of the pipe of an internal cooling system
84 cooling system of the battery cell (or battery module)
90 battery cell Whats is claimed is:

1. An interface system for mechanically decoupling an interface body and a cooling pipe of a cooling system for a battery cell or battery module of a vehicle, the interface system comprising:
   a housing for a battery cell or a battery module, the housing comprising a part having an opening;
   an inset having a first side and a second side opposite to the first side and being removably attached to the housing; and
   an interface body having a first end, a second end, and a bore-hole with a first opening open to the first end and a second opening open to the second end,
   wherein the inset has a recess in the second side to accommodate the interface body,
   wherein the interface body is inserted into the inset such that the first end of the interface body is in the recess of the inset and the first end of the interface body is also inside the housing and surrounds an outer surface of an inlet of the cooling pipe,
   wherein the inset is at least partially inserted into the part through the opening therein such that the first side of the inset is inside the housing,
   wherein the first side of the inset has an opening open to the first opening of the bore-hole of the interface body,
   wherein the inlet of the cooling pipe is arranged in the opening of the first side of the inset, and
   wherein the first opening of the bore-hole through the interface body is configured to slidably receive the inlet of a cooling pipe, and the second opening of the bore-hole is configured to be connected, in a fluid-tight manner, with an external coolant supply or coolant discharge.

2. The interface system according to claim 1, wherein the inset is inserted into the opening in the part of the housing, and
   wherein the interface body is inserted into the inset and over the inlet.

3. The interface system according to claim 1, wherein the inlet of the cooling pipe extends through the opening in the first side of the inset and is at least partially inserted, in a slidable manner, through the first end of the interface body into the first opening of the bore-hole of the interface body.

4. The interface system according to claim 3, further comprising a first seal between an inner surface of the opening in the first side of the inset and an outer surface of the inlet.

5. The interface system according to claim 4, further comprising a further seal between the inner surface of the first opening in the first end of the interface body and the outer surface of the inlet.

6. The interface system according to claim 5, wherein the first seal and/or the further seal is an elastic seal.

7. The interface system according to claim 1, wherein a drain channel is between the inset and the interface body.

8. The interface system according to claim 1, wherein the inset and the housing are configured such when the inset is not fixed to the housing, the inset is moveable relative to the housing from the outside of the housing through the opening in the housing into the inside of the housing.

9. The interface system according to claim 1, wherein the inset comprises a second seal abutting against an outer side of the housing when the inset is inserted into the opening in the part of the housing.

10. The interface system according to claim 1, wherein the inset is configured to be fixed to the part of the housing.

11. The interface system according to claim 10, wherein the inset comprises a first collar, and
    wherein the first collar abuts against an outside wall of the part of the housing.

12. The interface system according to claim 1, wherein the interface body is configured to be fixed to the inset.

13. The interface system according to claim 1, wherein the interface body is configured to be fixed to the part of the housing.

14. The interface system according to claim 13, wherein the inset comprises a first collar abutting against an outside wall of the part of the housing, and
    wherein the interface body comprises a second collar abutting against an outside wall of the part of the housing and/or against the first collar of the inset.

15. The interface system according to claim 13, wherein the inset comprises a second seal abutting against an outer side of the housing when the inset is inserted into the opening in the part of the housing, and
    wherein the interface body and the inset are both configured to be fixed to the part of the housing by a plurality of fixing elements.

16. A battery system comprising the interface system according to claim 1.

17. An interface system for mechanically decoupling an interface body and a cooling pipe of a cooling system for a battery cell or battery module of a vehicle, the interface system comprising:

a housing for a battery cell or a battery module, a cooling system, and a cooling pipe fluidly connected with the cooling system, the housing comprising a part having an opening;

an inset having a first side and a second side opposite to the first side and being removably attached to the housing; and an interface body having a first end, a second end, and a bore-hole with a first opening open to the first end and a second opening open to the second end, the interface body being fixed to the part of the housing, wherein the inset has a recess in the second side to accommodate the interface body, wherein the interface body is at least partially inserted into the inset such that the first end of the interface body is in the recess of the inset, wherein the inset is at least partially inserted into the part through the opening therein such that the first side of the inset is inside the housing, wherein the first side of the inset has an opening open to the first opening of the bore-hole of the interface body, wherein an inlet of the cooling pipe is slidably arranged through the opening in the first side of the inset, and wherein the inlet of the cooling pipe is slidably arranged through the first opening of the bore-hole through the interface body, and the second opening of the bore-hole is configured to be connected, in a fluid-tight manner, with an external coolant supply or coolant discharge.

* * * * *